Figure 1:
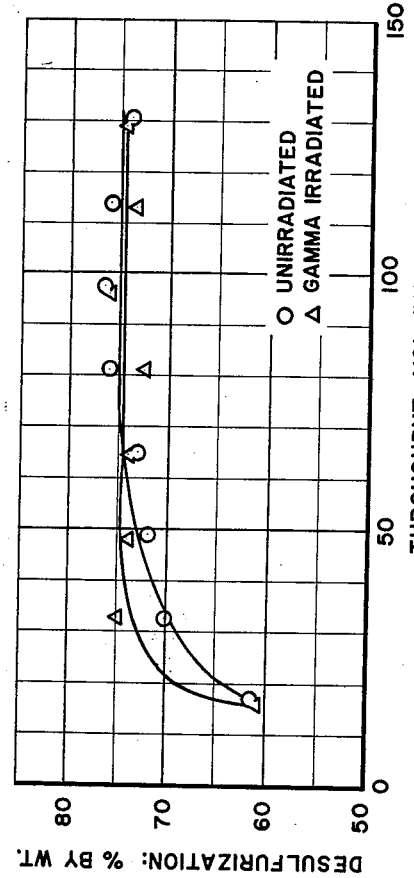

Jan. 22, 1963    L. DOMASH ETAL    3,074,880
IMPROVEMENT IN HYDRODESULFURIZATION WITH
AN IRRADIATED CATALYST
Filed Dec. 30, 1958

INVENTORS
LIONEL DOMASH
RICHARD A. FLINN
BY

ATTORNEY

United States Patent Office 3,074,880
Patented Jan. 22, 1963

3,074,880
IMPROVEMENT IN HYDRODESULFURIZATION WITH AN IRRADIATED CATALYST
Lionel Domash, Pittsburgh, and Richard A. Flinn, Verona, Pa., assignors to Gulf Research & Development Company, Pittsburgh, Pa., a corporation of Delaware
Filed Dec. 30, 1958, Ser. No. 783,936
3 Claims. (Cl. 208—216)

This invention relates to improved procedure for hydrodesulfurizing hydrocarbons.

It is known to contact sulfur containing hydrocarbons with hydrogen in the presence of hydrogenation catalysts such as nickel oxide-tungsten oxide or nickel oxide-molybdenum oxide catalysts deposited upon various carriers such as alumina, alumina containing a small amount of silica, kieselguhr, pumice, etc. We have noted that during such hydrodesulfurization at temperatures between about 550° and 725° F. the catalyst, during initial stages of the on-stream cycle, reaches maximum or high activity only after an appreciable portion of the on-stream cycle. This problem is not present at temperatures above about 725° F., i.e. at these higher temperatures the initial activity of the catalyst corresponds to its maximum activity.

This invention has for its object to provide improved procedure for hydrodesulfurizing hydrocarbons. Another object is to provide improved procedure for hydrodesulfurizing hydrocarbons utilizing a nickel oxide catalyst mixed with tungsten oxide or molybdenum oxide. A still further object is to provide improved procedure for hydrodesulfurizing hydrocarbons at temperatures between about 550° and 725° F. whereby the catalyst during the initial portion of the on-stream cycle is more rapidly brought to maximum or high activity. Other objects will appear hereinafter.

These and other objects of our invention are accomplished by contacting a hydrocarbon to be hydrodesulfurized with hydrogen in the presence of a nickel oxide catalyst combined with or mixed with tungsten oxide or molybdenum oxide, which catalyst has been subjected to irradiation with ionizing radiation. The contacting between the hydrocarbon to be hydrodesulfurized and the hydrocarbon takes place at a temperature between about 550° and 725° F.

In the following examples and description we have set forth several of the preferred embodiments of our invention, but it is to be understood that they are given for the purposes of illustration and not in limitation thereof.

The hydrodesulfurization procedure may, in accordance with our invention, include any of the prior art procedures for removing sulfur compounds from hydrocarbons by contacting them with hydrogen at elevated temperature and pressure. For instance it is known to subject hydrocarbons of various types such as residual hydrocarbons or whole or partial crudes to hydrodesulfurization in the presence of a hydrogenation catalyst. In such processes sulfur compounds are removed and residual or heavy hydrocarbons are simultaneously converted into lower boiling components to a certain extent. Our invention is applicable to such procedures. However, at the lower temperatures to which our invention is limited the amount of hydrocracking will usually be small. It is also known to subject lower boiling hydrocarbons such as gas oils, furnace oils, gasoline or naphtha, etc. to contact with hydrogen in the presence of hydrogenation catalysts in order to remove sulfur compounds with little or no concomitant hydrocracking or conversion into lower boiling components. Our invention is likewise applicable to all such procedures. In general these hydrodesulfurization procedures involve utilization of pressures between about 250 and 4000 p.s.i.g., temperatures between about 550° to 900° F., space velocities between about 0.25 and 10 volumes of charge stock per volume of catalyst per hour and a throughput between about 0.5 to 4000. These conditions will be utilized in carrying out our invention except that the tetmperature will be limited to the lower range described above, i.e. 550° to 725° F.

The catalyst employed in our invention may constitute a nickel oxide-tungsten oxide catalyst mixture or a combination of said oxides. Alternatively our invention is applicable to a catalyst comprising nickel oxide mixed with molybdenum oxide or a combination of said oxides. These catalysts are deposited upon or composited with a porous carrier such as activated alumina, alumina stabilized with a small amount of silica or other types of porous carriers. The catalyst may contain the amounts of nickel tungstate or nickel molybdate conventionally used in catalysts of this type. A total content of active metal (nickel plus molybdenum or nickel plus tungsten) between about 4 and 25 percent is usually employed. We prefer to employ catalysts containing between about 1 and 6 percent nickel (determined as metal) together with about 8 to 12 percent molybdenum or 10 to 18 percent tungsten.

Ionizing radiations can be obtained, for example, using radio isotopes, nuclear reactors or high energy particle accelerators. Examples of radio isotopes which can be used are cobalt 60 for gamma rays and strontium 90 for beta rays. Operating nuclear reactors of intermediate or full power size can be used as a source for either gamma rays or neutrons or both. Particle accelerators such as the cyclotron, bevatron, synchrotron, Van de Graaff or X-ray machines can also be used.

In effecting irradiation the catalyst can be introduced into a well in a nuclear reactor or through a tube which traverses the reactor. In some instances where it is desirable to expose the catalyst to fast or high energy neutrons only, and in the substantial absence of beta and gamma radiation, the irradiation can be conducted outside of the reactor using a collimated beam of fast neutrons. Such a collimated beam of fast neutrons can be obtained, for example, as described in U.S. Patent No. 2,708,656 to Enrico Fermi and Leo Szilard, by inserting a hollow shaft or tube into the central portion of the reactor. Gamma rays can be screened from the fast neutron beam by means of a sheet of bismuth metal extending across the path of the beam.

A neutron-free radiation source can be obtained directly from a homogeneous reactor by separating the radioactive fission gases, xenon and krypton, from the reactor core by conventional or modified gas-liquid separating means. A continuous supply of the radioactive fission gases could be obtained from such a reactor. The fission gases have a very high intensity of beta and gamma radiation but a very short half life. These gases possess about one percent of the total fission energy. The gases are chemically inert and therefore would not form undesired side reaction products.

The irradiation is of sufficient intensity and time of application to expose the catalyst to above about 0.05 and preferably to between about 0.1 and 1 watt hour of radiation per gram of catalyst. The catalyst is not harmed by excessive radiation and therefore there is no upper limit to the amount of radiation that can be used. However, for reasons of economy we prefer to limit the radiation to 10 watt hours per gram of catalyst. The same irradiation is applied to the catalyst before it is first employed in the hydrodesulfurization process and to the catalyst after combustion regeneration as described above. The irradiation may be carried out at subnormal, normal or elevated temperatures and pressures. Ordinary or atmospheric temperature and pressures are preferred. The rate of application of radiation is not of importance since the catalyst is very resistant to even high intensity radiation.

In most hydrodesulfurizations the catalyst more or less gradually becomes inactivated by deposition of coke thereon. In general the heavier the charge stock and the more the residual components contained therein, the more rapid the coke deposition. Also the more elevated the temperature, the more rapid the deposition. It is customary in these hydrosulfurization processes to subject the catalyst to a combustion regeneration when the coke deposition is sufficient to materially lower the activity of the catalyst. This procedure is followed in our invention. However, we have found that the activity of the catalyst after such regeneration even when used at a temperature between 550° F. and 725° F. is not at a high value corresponding to that when the catalyst was initially irradiated and initially used in the hydrodesulfurization process. Therefore in accordance with our invention the catalyst is again subjected to the ionizing radiation to impart to the catalyst the initial high acivity when it is subsequently again used in the hydrodesulfurization process.

EXAMPLE 1

A fluid catalytically cracked furnace oil distillate having the inspection shown in Table III was hydrodesulfurized by contacting with hydrogen at a temperature of 650° F., a pressure of 600 p.s.i.g., a space velocity (volume of charge per hour per volume of catalyst) of 8, and a hydrogen recycle rate of 4000 standard cubic feet per barrel. A catalyst was used in this hydrodesulfurization comprising nickel tungstate deposited upon an alumina-silica carrier. The catalyst contained 4 percent nickel and 9 percent tungsten (determined as metals). The catalyst carrier comprised 5 percent silica and 95 percent alumina. In one of the runs this catalyst was irradiated with gamma rays to a level of 0.39 watt hour of energy per gram of catalyst at room temperature and atmospheric temperature. The gamma rays were from spent fuel elements from an atomic pile emitting gamma rays having energies in the range between 0.22 and 2.5 m.e.v. In another of the runs unirradiated catalyst was used. The results from these runs are given in columns 1 and 2 of Table I.

The data in Table I have been plotted in FIGURE 1 of the drawing. It will be noted from these data and the drawing FIGURE 1 that the irradiation increased the initial activity of the catalyst but that the unirradiated catalyst overcame this initial disadvantage after about 60 throughput. Although our invention increases the desulfurization during the overall on-stream period, i.e. the average desulfurization, and we ordinarily prefer to continue the on-stream reaction until coke deposition requires regeneration, nevertheless when using severe conditions which give rise to formation of substantial coke and necessitating early regeneration, we prefer to terminate the reaction at a throughput below about 60 and regenerate the catalyst.

Figure 2:
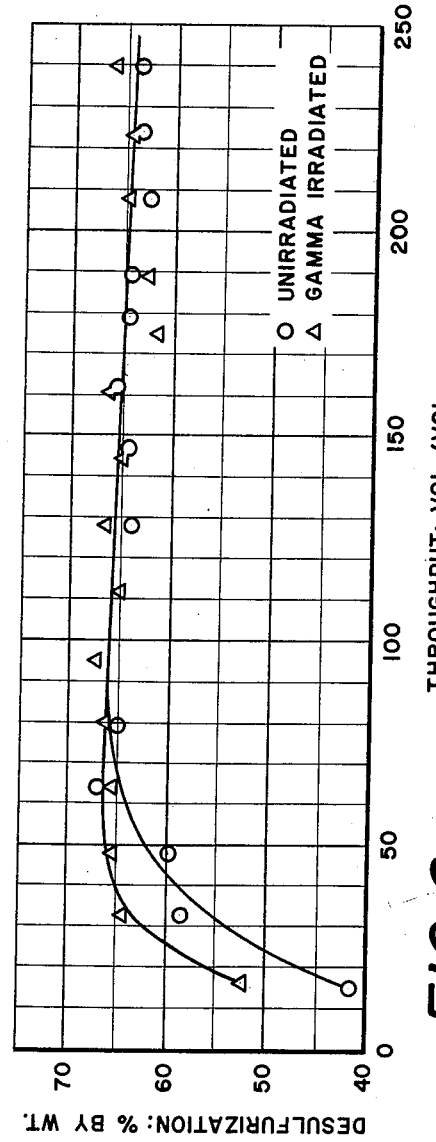

The irradiated catalyst used in the above test was subjected to normal regeneration at a temperature of 1100° F. with steam and air. Thereafter a portion of the catalyst was used in unirradiated condition for the same desulfurization reaction. The other portion of the regenerated catalyst was subjected to gamma irradiation to an extent of 0.39 watt hour per gram of catalyst and was thereafter used in the same reaction. The results from these two runs subsequent to the regeneration are given in Table II and are plotted in FIGURE 2 of the drawing. It will be noted that the catalyst did not initially have high activity after regeneration and that irradiation subsequent to each regeneration therefore is necessary in order to obtain the high initial activity.

Table I

| Hrs. on-stream | Column 1 Gamma irradiated catalyst, percent sulfur [1] | Column 2 Non-irradiated catalyst, percent sulfur [1] |
| --- | --- | --- |
| 4 | 0.37 | 0.43 |
| 6 | 0.37 | 0.40 |
| 8 | 0.36 | 0.39 |
| 10 | 0.36 | 0.34 |
| 12 | 0.38 | 0.33 |
| 14 | 0.38 | 0.35 |
| 16 | 0.37 | 0.38 |

[1] Corrected to 650° F. and 8.0 LHSV.

Table II

| Hrs. on-stream | Column 1 Gamma irradiated catalyst, percent sulfur [1] | Column 2 Non-irradiated catalyst, percent sulfur [1] |
| --- | --- | --- |
| 4 | 0.52 | 0.61 |
| 6 | 0.49 | 0.60 |
| 8 | 0.49 | 0.51 |
| 10 | 0.47 | 0.54 |
| 12 | 0.49 | 0.66 |
| 14 | 0.52 | 0.53 |
| 16 | 0.46 | 0.60 |
| 18 | 0.52 | 0.51 |
| 20 | 0.49 | 0.53 |

[1] Corrected to 650° F. and 8.0 LHSV.

Table III

Gravity _____ ° API__ 23.5
Sulfur _____ percent__ 1.46
Hydrocarbon type analysis, percent by vol. (FIA method):
    Aromatics _____ 62.6
    Olefins _____ 12.1
    Saturates _____ 25.3
Bromine No. _____ 24.9
Distillation, D-158:
    Over point _____ ° F__ 370
    End point _____ ° F__ 639
    10% at _____ ° F__ 445
    50% at _____ ° F__ 510
    90% at _____ ° F__ 590

EXAMPLE 2

A fluid catalytic cracking furnace oil distillate having the properties shown in Table IV was contacted with a nickel-tungsten catalyst deposited upon alumina containing a small amount of silica (5%) in a series of tests in which the catalyst was unirradiated in certain tests and in which the catalyst was irradiated in certain other tests. In the case of irradiated catalyst the irradiation was carried out by exposing the catalyst to cathode rays produced in a high velocity electron 2 m.e.v. Van de Graaff generator until an irradiation exposure of 0.52 watt hour per gram of catalyst. The catalyst in each case was identical except for the irradiation and contained about 4 percent nickel and about 9 percent tungsten (determined as metal), both components being present as oxides of the metals. The results of these tests are shown in Table IV, columns 1 and 2.

Table IV

| | Charge | Column 1 (not irradiated) | Column 2 (irradiated) |
|---|---|---|---|
| Operating conditions: | | | |
| Recycle gas rate: SCF/bbl | (¹) | 4070 | 4020 |
| Avg. H² content of recycle gas: Mol percent | (¹) | 51.1 | 50.5 |
| Avg. temperature: °F | (¹) | 697 | 701 |
| Pressure: P.s.i.g | (¹) | 610 | 600 |
| Liquid hourly space velocity: Vol./hr./vol | (¹) | 3.91 | 3.96 |
| Throughput: Vol./vol | (¹) | 46.93 | 47.50 |
| Balance: Percent by weight of charge: | | | |
| Hydrocarbon gases | (¹) | 0.0 | 0.1 |
| Liquid product | (¹) | 98.9 | 98.5 |
| Sulfur removed | (¹) | 1.3 | 1.5 |
| Total | (¹) | 100.2 | 100.1 |
| Liquid product inspection: | | | |
| Gravity: °API | 23.8 | 26.7 | 26.9 |
| Sulfur, GRM 1123: Percent | 1.93 | 0.69 | 0.47 |
| Olefins: Percent by vol. FIA Method | 12.1 | 2.0 | 2.9 |
| Bromine number: ASTM D 1159 | 27.4 | 15.0 | 13.7 |
| Aromatic content: Percent by vol. FIA method | 62.4 | 63.3 | 63.9 |

¹ Philadelphia FCC furnace oil distillate.

It will be noted that irradiation of this catalyst increased its activity so that the sulfur in the product was reduced from 0.69 percent (column 1) to 0.47 percent (column 2), or an improvement from 64.2 percent desulfurization to 75.6 percent.

EXAMPLE 3

A fluid catalytic cracking furnace oil distillate having the inspection given in Table V was subjected to hydrodesulfurization by contacting with hydrogen under the conditions given in Table V. In one pair of runs a cobalt molybdate catalyst (2.21 percent cobalt and 9.14 percent molybdenum, determined as metal) deposited upon alumina was used. One run with this catalyst was with unirradiated catalyst and the other run was with the same catalyst which had been subjected to electron irradiation of 0.52 watt hour per gram produced in a high velocity 2 m.e.v. Van de Graaff generator. The results of these runs are given in columns 1 and 2 respectively of Table V. It will be noted from a comparison of columns 1 and 2 that cobalt molybdate catalyst is not activated by irradiation. In another pair of runs a nickel molybdate catalyst (2.59 percent nickel and 8.16 percent molybdenum, determined as metal) deposited upon alumina was employed as a catalyst. In one of these runs the catalyst was not irradiated while the other was subjected to electron irradiation of 0.52 watt hour per gram prior to use in the hydrodesulfurization test run. The results of the runs with the unirradiated nickel molybdate catalyst is given in column 3 and the results with the irradiated catalyst are given in column 4 of Table V.

Table V

| | Charge | Column 1 non-irradiated | Column 2 electron irradiated | Charge | Column 3 non-irradiated | Column 4 electron irradiated |
|---|---|---|---|---|---|---|
| Operating conditions: | | | | | | |
| Gas rate (once-through pure hydrogen): SCF/bbl | (¹) | 2,090 | 1,978 | (¹) | 4,017 | 3,971 |
| Avg. Temperature: °F | (¹) | 701 | 698 | (¹) | 648 | 649 |
| Pressure: P.s.i.g | (¹) | 590 | 590 | (¹) | 590 | 590 |
| Liquid hourly space velocity: Vol./hr./vol | (¹) | 8.09 | 8.05 | (¹) | 8.06 | 8.11 |
| Throughput: Vol./vol | (¹) | 80.81 | 80.48 | (¹) | 48.35 | 48.67 |
| Balance: Percent by weight of charge: | | | | | | |
| Hydrocarbon gases | (¹) | 0.1 | 0.0 | (¹) | 0.1 | 0.1 |
| Liquid product | (¹) | 99.4 | 98.9 | (¹) | 99.1 | 99.1 |
| Sulfur removed | (¹) | 1.6 | 1.7 | (¹) | 0.8 | 0.9 |
| Total | (¹) | 101.1 | 100.6 | (¹) | 100.0 | 100.1 |
| Liquid product inspection: | | | | | | |
| Gravity: °API | 23.8 | 27.5 | 27.7 | 23.9 | 25.8 | 26.1 |
| Sulfur, GRM 1123: Percent | 1.93 | 0.31 | 0.29 | 1.39 | 0.59 | 0.49 |
| Olefins: Percent by vol. FIA method | 12.1 | 2.3 | 2.1 | 12.1 | 6.8 | 3.8 |
| Bromine number: ASTM D 1159 | 27.4 | 10.5 | 8.0 | 21.6 | 12.9 | 12.4 |
| Aromatic content: Percent by vol. FIA method | 62.4 | 62.2 | 61.8 | 60.5 | 58.3 | 59.7 |

¹ Philadelphia FCC furnace oil distillate.

We claim:

1. The process for hydrodesulfurizing a hydrocarbon which comprises contacting the hydrocarbon with hydrogen in the presence of a catalyst selected from the group consisting of nickel oxide-molybdenum oxide and nickel oxide-tungsten oxide composited with a porous carrier, which catalyst has been previously subjected to irradiation with ionizing radiation in an amount above about 0.05 watt hour per gram of catalyst, said contacting being carried out at a temperature between about 550° and 725° F., a pressure between about 250 and 4000 p.s.i.g., at a space velocity between about 0.25 and 10, terminating said contacting before a throughput of 60 has been reached, subjecting the catalyst to regeneration by contacting it with an oxygen-containing gas under combustion conditions, subjecting the regenerated catalyst to irradiation as specified above and re-using the regenerated and irradiated catalyst in said hydrodesulfurization process.

2. The process for hydrodesulfurizing a hydrocarbon which comprises contacting the hydrocarbon with hydrogen in the presence of a nickel oxide-tungsten oxide catalyst composited with an alumina carrier containing about 5 percent silica, which catalyst has been previously subjected to irradiation with ionizing radiation in an amount between about 0.1 and 1 watt hour per gram of catalyst, said contacting being carried out at a temperature between about 550° and 725° F., a pressure between about 250 and 4000 p.s.i.g., at a space velocity between about 0.25 and 10, terminating said contacting before a throughput of 60 has been reached, subjecting the catalyst to regeneration by contacting it with an oxygen-containing gas under combustion conditions, subjecting the regenerated catalyst to irradiation as specified above and re-using the regenerated and irradiated catalyst in said hydrodesulfurization process.

3. The process for hydrodesulfurizing a hydrocarbon which comprises contacting the hydrocarbon with hydrogen in the presence of a catalyst selected from the group consisting of nickel oxide-molybdenum oxide and nickel oxide-tungsten oxide composited with a porous carrier which catalyst contains between about 1 and 6 percent nickel and has been previously subjected to irradiation with ionizing radiation in an amount between about 0.1 and 1 watt hour per gram of catalyst, said contacting being carried out at a temperature between about 550° and 725° F., a pressure between about 250 and 4000 p.s.i.g., at a space velocity between about 0.25 and 10, terminating said contacting before a throughput of 60 has been reached, subjecting the catalyst to regeneration by contacting it with an oxygen-containing gas under combustion conditions, subjecting the regenerated catalyst to irradiation as specified above and re-using the regenerated and irradiated catalyst in said hydrodesulfurization process.

References Cited in the file of this patent
UNITED STATES PATENTS

| | | |
|---|---|---|
| 2,687,370 | Hendricks | Aug. 24, 1954 |
| 2,905,606 | Long et al. | Sept. 22, 1959 |
| 2,905,608 | Noddings et al. | Sept. 22, 1959 |
| 2,953,509 | Ruskin | Sept. 20, 1960 |
| 2,959,530 | Long et al. | Nov. 8, 1960 |